Patented Jan. 19, 1937

2,068,172

UNITED STATES PATENT OFFICE 2,068,172

MONO-AZODYESTUFFS

Richard Fleischhauer, Frankfort-on-the-Main-Fechenheim, Germany, assignor to General Aniline Works, Inc., New York, N. Y., a corporation of Delaware No Drawing. Application December 11, 1934, Serial No. 757,070. In Germany December 23, 1933

2 Claims. (Cl. 260—92)

This invention relates to mono-azodyestuffs, more particularly to those corresponding to the general formula:

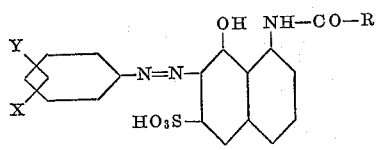

wherein X is selected from the group consisting of

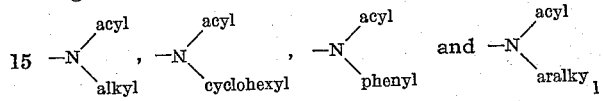

Y is selected from the group consisting of hydrogen, methyl, chlorine and a sulfonic acid group and R is selected from the group consisting of methyl, methoxymethyl, phenoxymethyl and phenyl.

These dyestuffs are obtained by combining a diazo-compound of an aromatic amine corresponding to the formula:

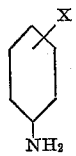

wherein X has the above signification and the nucleus may contain substituents of the aforesaid type, with an 1-acyl-amino-8-hydroxy-naphthalene-6-sulfonic acid.

In comparison to known analogous dyestuffs the dyestuffs of the present invention are distinguished partly by a better leveling power, partly by a better fastness to light.

The present invention represents a valuable enrichment of the industry. According to the invention bluish red dyestuffs are obtained of a very good leveling power and fastness to light which are especially suitable for dyeing animal fibers but may also be used for other dyeing purposes.

The components used may be varied in such a manner that e. g. the acyl-amino-group contains the following residues: methyl, ethyl, propyl, butyl, benzyl, cyclohexyl and so on, further phenyl and its substitution products. As acyl residues for example acetyl, methoxyacetyl, phenoxyacetyl, benzoyl, benzene-sulfonyl and their substitution products or also the urethane group may be named.

In order to further illustrate my invention the following examples are given, the parts being by weight and all temperatures in centigrade degrees; but I wish it, however, to be understood that my invention is not limited to the examples given, nor to the exact conditions stated therein.

Example 26.8 parts of N-butyl-benzoylamino-4-aminobenzene are diazotized and the almost colorless diazo solution thus obtained is allowed to run in while stirring at about 10° C. into a solution of 29 parts of 1-acetylamino-8-naphthol-6-sulfonic acid to which an excess of sodium acetate has been added. The dyestuff thus obtained is when dry a brownish red water soluble powder and dyes wool very level bright bluish red shades of a good fastness. It corresponds to the formula:

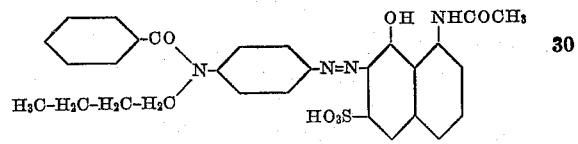

Similar dyestuffs of partly increased brightness are obtained when using as diazo component the ethyl-benzoylamino-4-amino-benzene, cyclohexyl-acetylamino-4-aminobenzene, cyclohexyl-acetylamino-4-aminobenzene-2-sulfonic acid, phenylacetylamino-4-aminobenzene, ethylacetylamino-4-aminobenzene, butyl-acetylamino-4-aminobenzene, butyl-acetylamino-4-aminobenzene-2-sulfonic acid, ethyl-benzoylamino-3-amino-4-methylbenzene, benzyl-benzoylamino-4-aminobenzene.

Other acyl derivatives of the 1-amino-8-naphthol-6-sulfonic acid, such as toluenesulfo-, benzoyl-, substituted benzoyl-, methoxyacetyl-, phenoxyacetyl-derivatives may be used as coupling components with equally good results.

I claim:
1. Monoazodyestuffs of the general formula

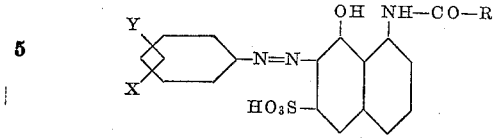

wherein X is selected from the group consisting of

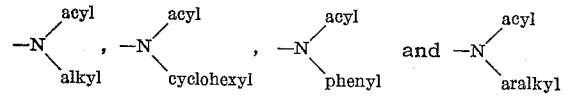

Y is selected from the group consisting of hydrogen, methyl, chlorine and a sulfonic acid group and R is selected from the group consisting of methyl, methoxymethyl, phenoxymethyl and phenyl, which dyestuffs are when dry reddish water soluble powders and dye the animal fibers bluish red shades of a very good leveling power and fastness to light.

2. The monoazodyestuff of the formula

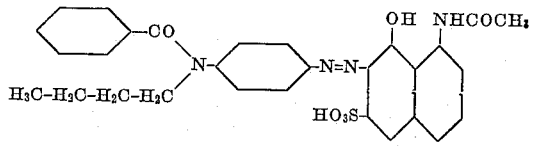

which is when dry a brownish red water soluble powder and dyes wool very level bright bluish red shades of a good fastness.

RICHARD FLEISCHHAUER.